UNITED STATES PATENT OFFICE.

LORENZ ACH, OF MANNHEIM, GERMANY, ASSIGNOR TO C. F. BOEHRINGER & SOEHNE, OF MANNHEIM-WALDHOF, GERMANY.

ALLOXAN-PHENOL AND PROCESS OF MAKING SAME.

SPECIFICATION forming part of Letters Patent No. 676,863, dated June 25, 1901.

Application filed March 6, 1899. Serial No. 708,003. (Specimens.)

*To all whom it may concern:*

Be it known that I, LORENZ ACH, a citizen of the Empire of Germany, residing at Mannheim, in the Empire of Germany, have invented certain new and useful Improvements in Alloxan-Phenols and Processes of Making the Same; and I do hereby declare the following to be a full, clear, and exact description of the invention, such as will enable others skilled in the art to which it appertains to make and use the same.

The present invention relates to the art of forming chemical condensation products; and the particular object is to prepare condensation products from the phenols and alloxan. I have discovered that these compounds when brought together under suitable conditions will unite, and thereby form well-defined condensation products. This condensation will take place in some cases when the component bodies are merely brought together in solution. The best results are obtained, however, when they are combined in the presence of suitable condensing agents. I have found in the course of my experiments that hydrochloric acid is particularly suitable as a condensing agent; but it is to be observed that the condensation may be carried out also by the aid of and in the presence of sulfuric acid, zinc chlorid, and other similarly-acting compounds. In the course of the reaction the phenol and alloxan unite molecule for molecule, and the reaction probably takes place in such a way that the ketone-carbon atom of the alloxan molecule and the benzyl nucleus are bound together, while at the same time the liberated atom of hydrogen is bound to the ketone oxygen of the alloxan.

My new process is applicable both to univalent and multivalent phenols. The compounds resulting from the same correspond to the type designated by the formula

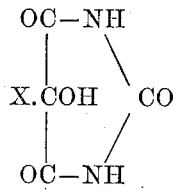

where X denotes the radical of a univalent or multivalent phenol less one atom of hydrogen.

The compounds of this new class of bodies so far as they have been investigated are all distinguished by ready crystallization. The derivatives of the benzene series are readily soluble in warm water and tolerably soluble in cold water. They are readily taken up by alcohol. Alloxan-alpha-naphthol is somewhat less soluble. The alloxan-phenols are useful as medicine and lend themselves readily to such use in view of their solubility in water and absence of taste. They are, moreover, useful as starting products in the preparation of other products useful in the arts.

Hitherto I have prepared such condensation products from—

1. *Alloxan and phenol proper*, the formula of the new compound being $C_{10}H_8N_2O_5 + H_2O$.

2. *Alloxan and meta-cresol.*—The formula of the new compound is $C_{11}H_{10}N_2O_5$. This body crystallizes from water in the shape of colorless needles. On heating to 230° centigrade it becomes colored, and at 270° it is decomposed with evolution of gas.

3. *Alloxan and para-cresol.*—These unite to a compound having the formula $C_{11}H_{10}N_2O_5$. It forms coarse needles when crystallized from an aqueous solution. At a temperature of from 228° to 230° centigrade decomposition takes place.

4. *Alloxan and guaiacol*, (formula of the new compound $C_{11}H_{10}N_2O_6 + H_2O$.)—Crystallizes in coarse colorless crystals from water. It melts at 150° centigrade.

5. *Alloxan and benzocatechin*, (formula $C_{10}H_8N_2O_6$.)—Crystallizes from water in the form of coarse prisms. On heating to over 200° centigrade decomposition of the compound takes place.

6. *Alloxan and resorcin*, (formula of the condensation product $C_{10}H_8N_2O_6$.)—It crystallizes in the shape of fine colorless crystals from acetic ether and is gradually decomposed on heating beyond 200° centigrade.

7. *Alloxan and hydroquinone*, (formula $C_{10}H_8N_2O_6$.)—Crystallizes in the shape of prisms from water. It becomes darker colored on heating to 170° centigrade and is completely decomposed when heated to from 205° to 207° centigrade.

8. *Alloxan and pyrogallol,* (formula $C_{10}H_8N_2O_7 + H_2O$.)—Crystallizes from water in the form of coarse needles which decompose at about 230° centigrade.

9. *Alloxan and alpha-naphthol.* (formula $C_{14}H_{10}N_2O_5$.)—Rather difficult of solution even in hot water. On cooling such a solution the compound crystallizes either in the form of acicular or shining foliated crystals. On heating it gradually decomposes.

In order to enable those skilled in the art to which this invention pertains to carry the same into effect, I will now give a detailed description of the same by describing in detail a number of examples constituting what I consider the best manner of carrying my invention into effect.

1. *Preparation of alloxan-phenol.* (a) *Condensation by means of hydrochloric acid.*—I dissolve 21.4 kilograms of alloxan in seventy liters of water and add to the solution 9.4 kilograms of phenol and mix the whole by stirring or otherwise agitating. By this action the phenol becomes suspended in the alloxan solution. I then introduce into the suspended mixture a strong current or jet of hydrochloric acid in the form of a gas or in aqueous solution, taking care at the same time that the mixture does not become too highly heated by this action. This is best done by cooling by water circulating around or through the mixture. The temperature should not rise above 60° to 70° centigrade. As a result of this treatment the phenol gradually goes into solution. When a clear solution has been attained, the introduction of hydrochloric acid is discontinued and the whole is allowed to stand until it congeals or solidifies in the form of a thick pasty mass of crystals. The crystals are then separated from the mother-liquor and purified by recrystallizing from water. In this way the new condensation compound is obtained in the shape of beautiful colorless large-sized crystals, whose composition corresponds to the formula:

$$C_{10}H_8N_2O_5 + H_2O.$$

These crystals become colored yellow when heated to over 200° centigrade, and they melt at from 255° to 257° centigrade. The melting takes place with violent evolution of gases and consequent decomposition. As is manifest, the operation is equally successful when a solution of alloxan in hydrochloric acid or an alloxan solution very strongly acidulated with HCl is employed instead of the above aqueous solution of the alloxan. Under these conditions the separate introduction of the HCl current may be entirely or partly dispensed with. Such acidulated alloxan solutions may be obtained directly by oxidizing uric acid with hydrochloric acid and chlorate of potash. It is of considerable advantage to hasten the solution of the phenol to add a quantity of alcohol. For example, the process may be carried out as follows: To a warm solution of 21.4 kilograms of alloxan in an equal quantity of water are added 9.4 kilograms of phenol and ten liters of alcohol. To the clear solution thus obtained are added twenty-one liters of fuming hydrochloric acid of specific gravity 1.19, and the whole is gently warmed on the water-bath. After a short time the alloxan-phenol begins to separate, the quantity of the same being considerably increased on cooling.

(b.) *Condensation by means of zinc chlorid.*—21.4 kilograms of alloxan are dissolved in an equal quantity of hot water, and 9.4 kilograms of phenol are then added. Nine kilograms of zinc chlorid are then added to the mixture, and the whole is stirred. A clear solution thus results, which is then gently warmed for some time (about thirty minutes) on the water-bath. On cooling the alloxan-phenol separates out, and the same may be purified by recrystallization from water, as stated above.

2. *Preparation of alloxan-alpha-naphthol.*—One hundred and fifty grams of alpha-naphthol in one hundred and sixty grams of alcohol are added to a hot solution (70° centigrade) of two hundred and twenty grams of alloxan in two hundred and twenty grams of water. An oily substance separates. When this takes place, the whole is heated on the water-bath, and three hundred and fifty grams of fuming hydrochloric acid are added. As a result of this a clear solution is formed, which in turn stiffens to a crystalline mass, the crystals being composed of the new compound alloxan-alpha-naphthol having the formula $C_{14}H_{10}N_2O_5$. The reaction is indicated by the equation:

$$C_{10}H_7OH + C_4H_2N_2O_4 = C_{14}H_{10}N_2O_5.$$

The new compound is soluble with difficulty in hot water. It crystallizes either in needles or in shining foliated crystals. It is gradually decomposed on heating.

3. *Preparation of alloxan-guaiacol.*—Five hundred and twenty grams of alloxan are dissolved in an equal quantity, by weight, of hot water. To this solution are added seven hundred grams fuming hydrochloric acid and a solution of three hundred grams of guaiacol in four hundred grams of alcohol. Into the clear liquid obtained, which is maintained at room temperature, (about 15° centigrade,) hydrochloric acid is introduced until the solution begins to give off fumes. After the lapse of several hours the condensation product separates off. The same is then removed by siphoning or decanting and recrystallized from water, when it is obtained in the form of coarse crystals containing one molecule of water of crystallization. They melt at 150° centigrade, the melting being attended by gas evolution.

The new compound has the formula $$C_{11}H_{10}N_2O_6$$

and the reaction which takes place in its formation is expressed in the equation:

$$C_6H_4(OH)(OCH_3) + C_4H_2N_2O_4 = C_{11}H_{10}N_2O_6.$$

*4. Preparation of alloxan-pyrogallol.*—One hundred and thirty grams of pyrogallol are added to a warm solution of two hundred and twenty grams alloxan in an equal weight of water, and the whole is heated on the water-bath until solution ensues. On cooling the new condensation product separates off. The same forms coarse needles or prisms having the formula $C_{10}H_8N_2O_7 + 2H_2O$ and which are decomposed on heating to about 230° centigrade. The reaction proceeds according to the equation:

$$C_6H_3(OH)_3 + C_4H_2N_2O_4 = C_{10}H_8N_2O_7.$$

As will be seen from the above, my invention, broadly considered, consists in adding alloxan to a phenol either without a condensing agent or in the presence of a condensing agent, such as hydrochloric acid, sulfuric acid, zinc chlorid, or other equivalents, the hydrochloric acid being deemed particularly desirable.

My invention further consists in the new series of compounds produced and in such further features and methods as will be hereinafter set forth, and pointed out in the claims.

The condensation products so far as they have been examined by me are all distinguished by their solubility in alcohol, and, with the exception of the alpha-naphthol product, their solubility in warm water and tolerable solubility in cold water, by their ready crystallizability, and many of them by their tendency to decompose at their melting temperatures.

Having thus fully described my invention, what I claim as new, and desire to secure by Letters Patent of the United States, is—

1. In the process of preparing condensation products from phenols and alloxan, the step which consists in reacting upon alloxan with a phenol.

2. The process which consists in adding a phenol to alloxan solution and heating the mixture.

3. The process which consists in adding a phenol to alloxan in the presence of a condensing agent.

4. The process which consists in reacting upon alloxan with a phenol and hydrochloric acid.

5. The process which consists in adding a phenol to alloxan together with alcohol and causing a condensing agent to act on the mixture.

6. The process which consists in adding a phenol to alloxan together with alcohol and then introducing hydrochloric acid into the mixture.

7. The process which consists in adding a phenol to alloxan and then introducing a stream of hydrochloric acid into the mixture while maintaining the temperature at a reduced point.

8. The process which consists in adding a phenol solution to a solution of alloxan and agitating the mixture, then introducing into the mixture a stream of hydrochloric acid and maintaining the temperature of the mixture at a reduced point, the last two steps being continued until a clear solution results.

9. As a new chemical compound a condensation product of phenols and alloxan, which is distinguished by the above formulæ; which readily forms crystals, is soluble in alcohol and warm water.

10. As a new chemical compound a condensation product of phenol and alloxan which is distinguished by the above formulæ; which readily forms crystals, is readily soluble in alcohol and warm water and which is decomposed at its melting temperature.

In testimony whereof I affix my signature in presence of two witnesses.

LORENZ ACH.

Witnesses:
  LEO BEENSCH,
  JACOB ADRIAN.